United States Patent [19]
Zeman

[11] 3,774,850
[45] Nov. 27, 1973

[54] WATER DISTRIBUTING TUBE

[76] Inventor: David G. Zeman, 10030 Greenleaf Ave., P.O. Box 3021, Santa Fe Springs, Calif. 90607

[22] Filed: July 10, 1972

[21] Appl. No.: 270,456

[52] U.S. Cl. ............... 239/542, 239/547, 239/553.5
[51] Int. Cl. ............................................. B05b 15/00
[58] Field of Search ................ 239/542, 547, 553.5, 239/DIG. 19; 47/27

[56] References Cited
UNITED STATES PATENTS

| | | | |
|---|---|---|---|
| 2,566,833 | 9/1951 | Healy | 239/547 X |
| 3,080,124 | 3/1963 | Rathman | 239/542 X |
| 2,807,505 | 9/1957 | Weitzel | 239/542 UX |
| 3,698,195 | 10/1972 | Chapin | 239/542 X |
| 3,667,685 | 6/1972 | Rinkewich | 239/542 |

Primary Examiner—Richard A. Schacher
Assistant Examiner—Gene A. Church
Attorney—Edward D. O'Brian

[57] ABSTRACT

A tube for agricultural uses in distributing water to plants located along the length of the tube can be constructed utilizing a continuous tube of a thermoplastic, preferably biodegradable polymer. Such a tube includes a plurality of outlet openings located along its length and means securing the interior walls of the tube together adjacent each of the outlet openings so as to restrict the flow of water to each of the outlets. Such a tube may be conveniently shipped in a flat, coiled configuration. Preferably the walls of the tube are thin enough to be broken up by normal agricultural instruments such as plows.

13 Claims, 8 Drawing Figures

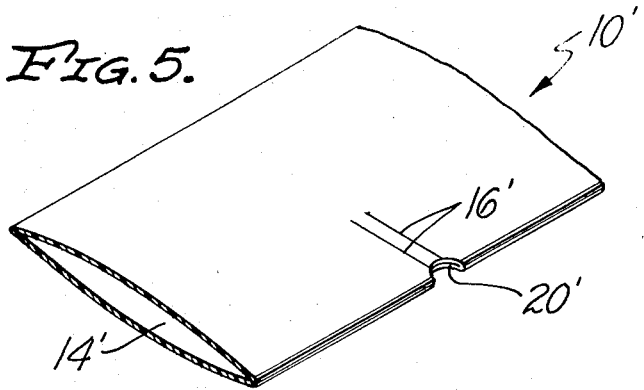
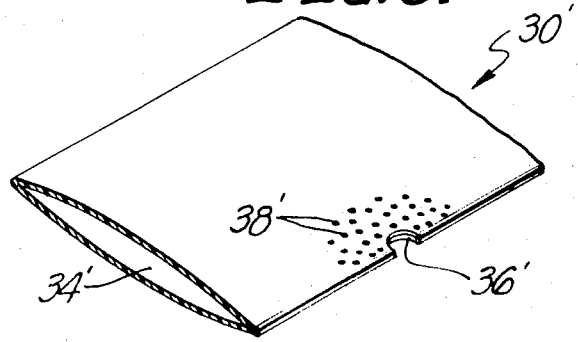
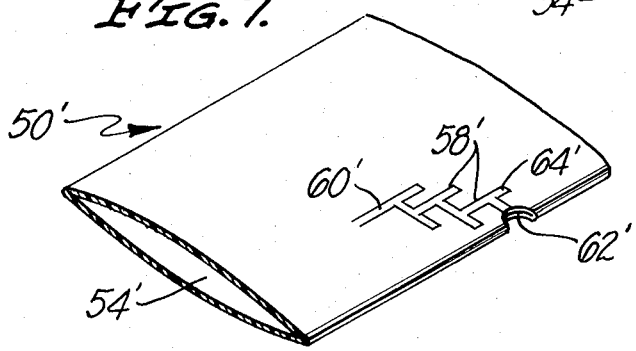
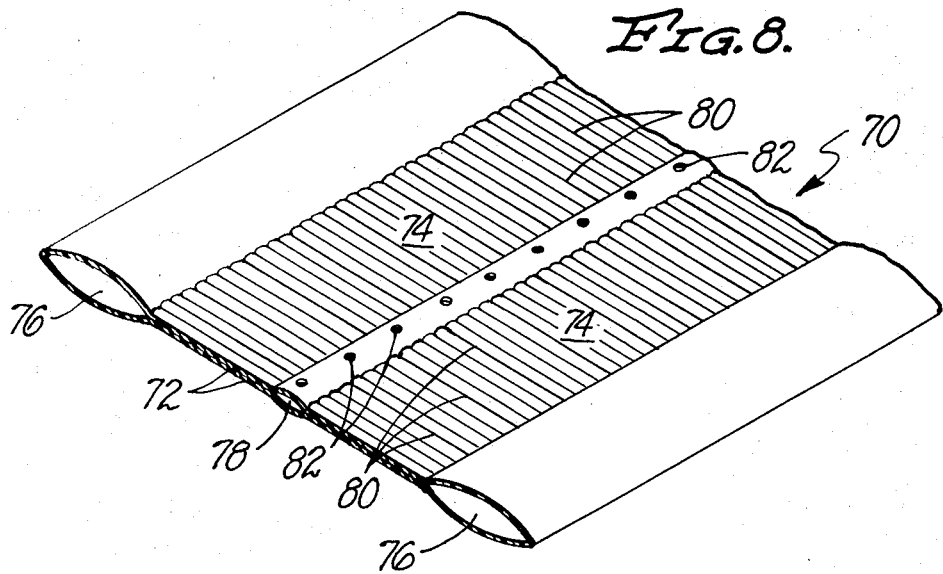

WATER DISTRIBUTING TUBE

BACKGROUND OF THE INVENTION

The invention set forth in this specification relates to tube and conduit which are primarily intended for agricultural uses in distributing water along rows of plants. It is considered however that tubes as herein described can be effectively utilized in distributing water or other liquids for other purposes.

For many years it has been customary to water or irrigate plants by procedures such as by flooding fields, by flowing water through irrigation ditches dug in the soil and by the use of sprinklers. Unquestionably procedures of these general types are utilitarian. It is frequently considered however that they are undesirable for any one of severa' different reasons. Conventional procedures of this type tend to be somewhat wasteful of water in that some of the water used with them is lost without promoting plant growth. Also these procedures are considered somewhat disadvantageous from an economical standpoint for other reasons.

As a result of the realization of these factors a number of efforts have been made at developing so-called "drippers" or "soakers" for use in watering plants. Such structures have normally utilized water impervious tubes used to convey water to various structures or means located on such tubes for distributing the water to plants. Such structures or means have varied widely in character.

Many of such structures or means have been of a valve-like character. Frequently they have been constructed in such a manner so as to include openings capable of being enlarged upon a sudden increase of pressure so as to release sediment tending to cause these openings to become clogged. Some of these structures have involved the use of porous members—including thread—designed to slowly release water from the interior of a tube. Other of these structures have involved the use of carefully formed holes in tubes designed to release only limited amounts of liquid. Certain of these structures have involved the use of several flow passages in a single tube connected by such holes.

Although so-called "drippers" or "soakers" as indicated in the preceding are unquestionably utilitarian to at least a degree, it is not considered that any one of these structures is completely satisfactory for commercial utilization with rows of agricultural crops. The reasons for this are varied, but are primarily economical in character.

To be acceptable a water distribution tube or system must perform satisfactorily to water plants without any significant or undue water of water. Also to be acceptable, such a tube or system must be relatively inexpensive so as to facilitate its widespread adoption and utilization. It is also considered that a water distribution tube or system must not present any significant disposal or recovery problem to any agricultural grower if such a tube or system is to be commercially accepted on a large scale. It is not considered that any of the prior soakers or drippers adequately meet these criteria for widespread commercial acceptability.

SUMMARY OF THE INVENTION

An object of the present invention is to provide new and improved distributing tubes for agricultural use. More specifically, the invention is intended to provide water distributing tubes which overcome various limitations and disadvantages of prior "drippers" and "soakers" as briefly indicated in the preceding discussion. Further objectives of the present invention are to provide water distributing tubes which may be easily and conveniently manufactured at a comparatively nominal costs, which can be easily and economically handled and shipped, which may be simply and inexpensively located in operative locations, which are capable of giving satisfactory performance when installed and which normally do not present any significant disposal or removal problems.

These and various related objectives of the invention as will be apparent from a detailed consideration of the remainder of this specification and the accompanying drawing are achieved by forming a tube for use in distributing water along the length of the tube, said tube having a plurality of outlets located along its length and being formed of an impervious material, so that the tube includes the improvement comprising means securing the walls of said tube together adjacent each one of said outlets so as to restrict the flow of water to each of said outlets. Such means operate to restrict the flow of water by creating one or more passages which are smaller than the interior of the tube adjacent to such means so that the interior of the tube adjacent such means serves as a principle flow area within the tube.

In accordance with this invention the means securing the walls of the tube can be of different shapes so as to define a labyrinth type combination of passages, a tortuous series of paths or a single passage. Preferably a tube as used is sufficiently thin so that it can be readily broken up by normal agricultural implements such as are used to till the soil, such as plows, discs and the like. Also preferably the tube used is of a biodegradable, organic polymer composition which will decompose at the end of a growing season of a particular type of plant with which the tube is used.

BRIEF DESCRIPTION OF THE DRAWING

Further details with respect to the present invention are best indicated with reference to the remainder of this specification and the accompanying drawing in which:

FIG. 5 is an isometric view of a repetitive unit or length of a third modified tube in accordance with this invention;

FIG. 6 is an isometric view of a repetitive unit or length of a fourth modified tube in accordance with this invention;

FIG. 7 is an isometric view of a repetitive unit or length of a fifth modified tube in accordance with this invention; and FIG. 8 is an isometric view of a section or length of a sixth modified tube in accordance with this invention.

Figure 1:
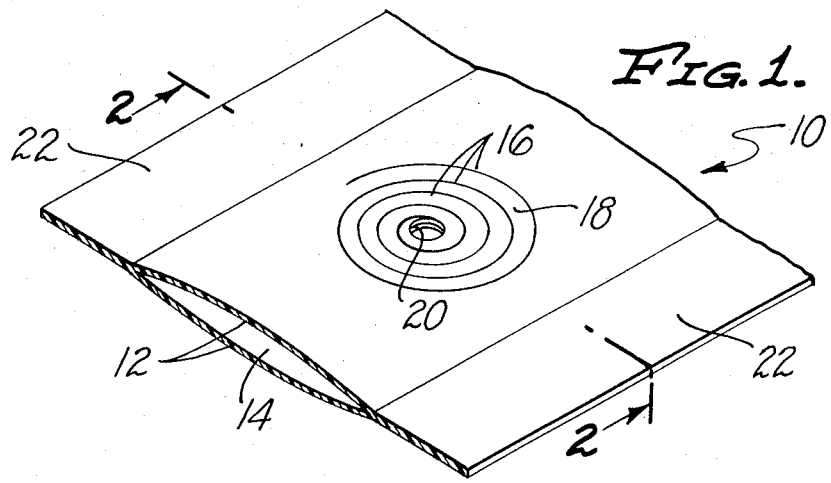
FIG. 1 is an isometric view of a repetitive unit or length of a tube in accordance with this invention.

The accompanying drawing is primarily intended to illustrate for explanatory purposes a series of present embodiments or forms of tubes in accordance with the present invention in an enlarged, diagrammatic manner. All of these structures utilize intangible concepts or principles of the invention as are set forth and defined in the appended claims. These concepts or principles can be utilized in many ways in various differently appearing structures through the use or exercise of routine engineering skill.

DETAILED DESCRIPTION OF THE PREFERRED EMBODIMENT

All of the tubes illustrated in the drawing may be formed out of a flexible, impervious polymer material such as a conventional polyethylene composition or the like. No useful purpose is seen in encumbering this specification with a long detailed analysis of various polymers and polymer compositions which can be utilized in constructing these tubes inasmuch as such polymers and compositions are well-known to the plant irrigation or watering field. It is preferred that any such polymer or compositions used be of an impervious character so that any watering achieved with the tube described will occur at openings as hereinafter described.

Although tubes as indicated can be manufactured from a wide variety of polymer compositions it is preferred to manufacture these tubes of a bio-degradable, flexible, impervious polymer or polymer composition. One such composition is disclosed in the U.S. Pat. No. 3,590,528 entitled, "Decomposable Polybutene-1 Agricultural Mulch Film" issued to Thomas H. Shepard July 6, 1971. It is considered that many other biodegradable polymers and compositions are known and are currently being developed in response to an increasing public demand in polymers which do not present any significant disposability problem.

It is preferred to form the tubes indicated in the drawing out of such materials so that these tubes do not have to be recovered from a field after a growing season. It will be realized that the term "growing season" used here designates a variable period, the length of which varies primarily in accordance with the length of time it takes to produce a crop from a specific type of plant. This period of time will normally be in the duration of roughly three months. However, some agricultural crops are considered to take time periods up to several years to mature. The precise time involved with any specific crop will be somewhat variable in accordance with a number of factors such as ambient rainfall, ambient temperature and the like.

Because of this it is preferred that the tubes in accordance with this invention be of a polymer composition which will not bio-degrade or will not significantly bio-degrade until after the end of a drowing season during which they have been used. Thus, these tubes will remain impervious during such a time interval. A precise polymer or polymer composition which will bio-degrade at a desired time interval will in all cases have to be selected on the basis of the recognized bio-degration time of the polymer or composition so that this time at least exceeds the growing season of a plant with which a tube is to be used. This information can be readily determined with reference to the technical literature as to the bio-degration periods of polymers and polymer compositions and the growing periods of various different plants.

It is also preferred that the tubes illustrated in the drawing be formed so that they are sufficiently thin as to be capable of being broken up easily at the end of the growing season utilizing conventional agricultural equipment such as is utilized to plow under grown plants or as to otherwise till or cultivate the soil. This feature of making these tubes so that they can be easily broken up in this manner is considered important in alleviating the necessity for recovery operations.

When a tube as herein described is cut or broken into small segments using agricultural implements, even if such a tube is not formed of a bio-degradable material it will normally not present any significant soil problem. Such broken-up strips of polymer material can be easily removed from a field by rakes or similar equipment in many cases. When a tube as herein described is formed out of a bio-degradable material the breaking up and plowing under of the tube is considered to facilitate bio-degration of the tube at the end of a growing season.

The thicknesses of the tubes illustrated therefore are preferably correlated with the nature of the specific agricultural implements to be utilized in breaking up and plowing under these tubes. The cutting or breaking abilities of various different agricultural implements such as may be used for this purpose vary widely. Therefore, a tube of one specific thickness may be capable of being broken up or cut into small pieces by one type of an implement such as a conventional disc and may be capable of being broken up by another type of an implement such as a cultivator.

These factors and the fact that different polymers and compositions useable in tubes in accordance with this invention differ somewhat in strength characteristics make it substantially impossible to give meaningful ranges of the wall thicknesses of tubes preferred in accordance with this invention. This matter is further complicated by the fact that the thickness of the material in the tube as illustrated should be varied in accordance with the pressure of water to be utilized within the tube.

In general the material to be used should be just sufficiently thick to withstand the internal water pressure to be applied to it without rupture, but should not be any thicker than is indicated by this consideration. The reasons for this are economical. The lower the quantity of material in a tube in accordance with this invention, the lower the cost of the tube. One significant aspect or feature of the invention is the fact that tubes herein described are so inexpensive to manufacture and use that they can be conveniently adopted in place of existent watering equipment and can be discarded at the end of a growing season.

Figure 2:
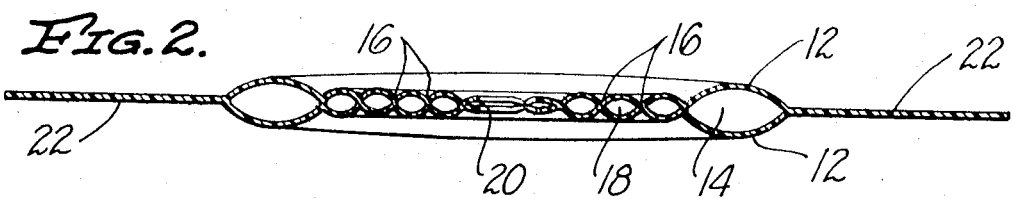
FIG. 2 is an enlarged cross-sectional view of the embodiment of the invention shown in FIG. 1 corresponding to a view taken at line 2—2 of FIG. 1 showing the tube illustrated in FIG. 1 as it would appear during use.

In FIGS. 1 and 2 of the drawing there is shown a part of a length of a tube 10 in accordance with this invention. This tube 10 is formed as a seamless body having two walls 12 which cooperate together so as to define an internal flow channel or conduit 14. These walls 12 are internally joined together at periodic intervals along lines 16 in such a manner that the tube 10 in a collapsed condition will lay flat for convenience of handling, coiling and uncoiling and the like. These lines 16 are arranged in a spiral manner so as to define at least one flow passage 18 leading from the interior of the flow channel or conduit 14 to a centrally located hole 20.

The use of this tube 10 is essentially very simple. Prior to use it is laid along a row of agricultural plants in a line so that the repetitive holes 20 are located adjacent to various locations where water is to be dispensed. An end of the tube 10 is then connected in a conventional manner to an appropriate water source so as to inflate the flow channel 14 along the length of the tube 10. The water in this flow channel 14 will pass out through the passages 18 at a restricted rate dependent upon the dimensions of these passages 18.

If these passages 18 are of sufficiently small diameter to be of a capillary or nearly capillary type, the amount of water dispensed in this manner will be less than if the water flows through the passages 18 in accordance with normal flow considerations. In effect, the passages 18 are intended to provide resistance to flow from within the flow passage 14 so that there is a pressure drop between the interior of the flow passage 14 and the openings 20 which will dispense controlled amounts of water in accordance with the applied water pressure and the dimensions within the tube 10.

The amounts of water dispensed in this manner can be varied by changing dimensions within the tube 10, can be varied to a degree by varying the water pressure applied within the flow channel 14 or can be varied by a user of the tube 10 varying the lengths of the passages 18 by punching out the portions of the tube 10 around the openings 20 so as to decrease the length of these passages 18. An instrument corresponding to a common paper punch or leather punch may be used for this purpose. This ability to regulate or control the amount of water dispensed from any specific opening 20 so as to increase this amount can be important to an agricultural grower if, for example, such a grower should determine that more water should be dispensed from a particular opening 20 than is being dispensed from such an opening.

The tube 10 also includes extensions 22 extending from the juncture of the walls 12. These extensions 22 are in the nature of flaps and are designed to be utilized when the tube 10 is employed in such a manner that agricultural plants grow upwardly through the openings 20 in a tube 10. These extensions 22 extend outwardly from the tube 10 in such a manner as to cover the ground adjacent to the tube 10 in order to inhibit the growth of weeds or the like when the tube 10 is used in this manner. These extensions 22 may be of any convenient dimension for any particular application. It is to be understood, however, that the tube 10 can be utilized without these extensions 22 both alongside a raw of plants and in such a manner that plants grow through the openings 20.

Figure 3:
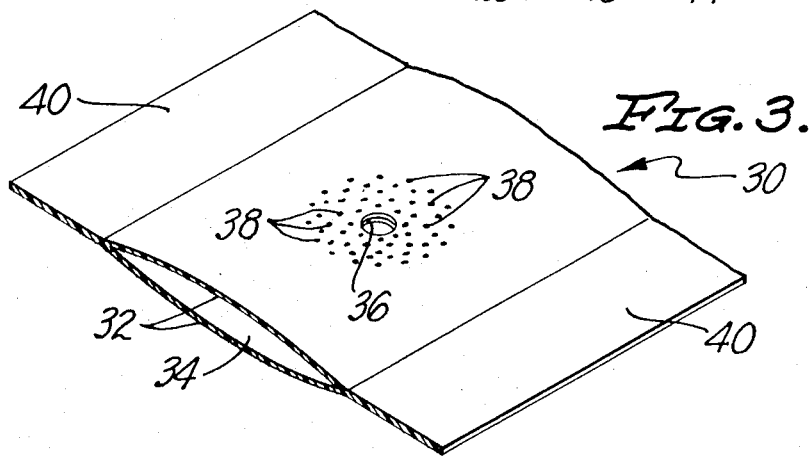
FIG. 3 is an isometric view of a repetitive unit or length of a first modified tube in accordance with this invention.

In FIG. 3 of the drawing there is shown a modified tube 30 of the present invention which is essentially very similar to the tube 10 in that it also utilizes walls 32 corresponding to the walls 12 described defining an internal flow channel 34 utilized to supply water to any of a series of openings 36 located along the length of this tube 30. In the tube 30 the walls 34 are secured together around each of the openings 36 at a series of points 38 so as to define a multiplicity of tortuous flow paths (not numbered) leading from the flow channel 34 to each opening 36.

Such flow paths have the same effect as the passages 18 in restricting the flow of water. In addition, however, they have the added advantage of permitting the flow of water through the openings 36 in the event that any particular path between or around the points 38 should become clogged from the growth of algae, the accumulation of sediment or the like. If desired, the tube 30 may also include extensions 40 corresponding to the extensions 22.

Figure 4:
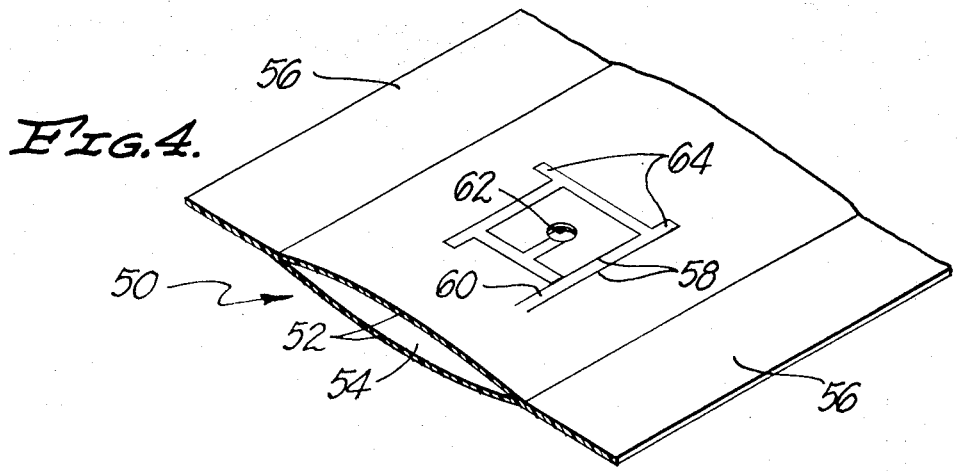
FIG. 4 is an isometric view of a repetitive unit or length of a second modified tube in accordance with this invention.

In FIG. 4 of the drawing there is shown a further modified tube 50 in accordance with this invention which has walls 52 defining an internal flow channel 54. If desired, these walls 52 may be provided with extensions 56 corresponding to the extensions 22. These walls 52 are periodically secured together by groups of lines 58, each of which groups defines a labyrinth type of flow passage 60 leading from the interior of the flow channel 54 to openings 62. These flow passages 60 operate in essentially the same manner as the flow passage 18. In addition, however, because of their configuration they have a plurality of "dead end" areas 64 which to at least a degree tend to trap and hold sediment as water flows through flow passages 60 in such a manner so as to minimize clogging within these flow passages 60.

It will be realized from the aforegoing that the tubes 30 and 50 may be utilized in substantially the same manners as to the tube 10. On some occasions it may be desirable to utilize tubes corresponding to these tubes 10, 30 and 50 in such a way that water is not delivered from their centers. In FIGS. 5, 6 and 7 there are shown modified tubes 10', 30' and 50' which are intended for use in such "side" delivery or dispensing of water.

These tubes 10', 30' and 50' are so similar to the tubes 10, 30 and 50, respectively, that they are not described in detail herein. Various parts of these tubes which are the same or substantially the same as corresponding parts of the previously described tubes are designated in the specification and in the drawing by the primes of the numerals previously used to designate such parts. None of these parts are specifically described as separate elements herein.

From an examination of the drawing it will be noted that the tubes 10', 30' and 50' all have their dispensing openings 20', 36' and 62' located along their side edges. These openings may conveniently be enlarged as indicated in the preceding with a punch, a pair of scissors or the like to adjust the flows through them as indicated. Although it is not normally considered desirable, it is possible to utilize extensions corresponding to the extensions 22', 40' and 56' with the tubes 10', 30' and 50'.

FIG. 8 of the drawing shows a tube 70 in accordance with the present invention formed as a seamless body having two walls 72 which are joined together along areas 74 extending parallel to the side edges of these walls 72 so as to define flow channels or conduits 76 adjacent to the edges of the walls 72 and an internal parallel distribution channel or conduit 78 spaced midway between the flow channels or conduits 76. These areas 74 are formed utilizing lines 80 corresponding to the lines 16 previously described located parallel to one another so as to lead from each of the flow channels 76 to the distribution channel or conduit 78.

These lines 80 are spaced so that the areas between them and between the walls 72 will serve as the previously described flow passage 18 so as to convey a limited amount of water from the flow channels 76 to the distribution channel 78. The action here is the same as that previously indicated in connection with the discussion of the flow passage 18. In the tube 70 the distribution channel 78 is provided with a series of small perforations 82 which will dispense the liquid supplied through the distribution channel 78 to the exterior of the tube 70.

This tube 70 is used in nearly the same manner as the previously described tubes by spreading it out over an agricultural area and connecting it to an appropriate water source in a conventional manner so that water is supplied to each of the flow channels 76. Such water will move through the areas 74 to the distribution channel 78 and will slowly seep through the small holes 82 in this distribution channel 78. It is considered that the tube 70 is particularly significant in that water can be supplied from either or both of the flow channels 76.

Thus, if one of the areas 74 leading from one of the channels 76 should for one reason or another become clogged, water can still enter the distribution channel 78 from the other of these flow channels 76. Further, the amount of water dispensed can, to a degree, be regulated by utilizing either one or both of these flow channels 76. To a degree, a type of a back flushing action may be achieved with the tube 70 by applying water to the distribution channel 78 when no water is applied to the flow channels 76. Such a back flushing action will, of course, involve the dispensing of water, but at the same time it will involve the reverse flow of water through the areas 74 to a degree sufficient to tend to at least partially clean out any blockages in these areas 74.

It will be obvious that this tube 70 may be modified in many ways. It may include side extensions such as the previously described extensions 72. Further, the lines 80 may be replaced with a series of points or regions corresponding to the previously described points 38. They may also be replaced with lines corresponding to the lines 58 defining adjacent labyrinth-type flow passages.

On occasion, the minor restrictions presented in a single tube around the openings 20 by the associated lines 18, around the openings 36 by the points 38 and around the openings 62 by the lines 58 may be objectionable to a particular grower. In these cases the entire center regions of two walls of a tube as described can be formed in the manner indicated in FIG. 8 so that two edge flow channels are connected by a single region containing means securing two walls together such as any of the means herein indicated and the openings for water dispensing can be located along the central area of such regions. This type of structure may be advantageous in tending to prevent any restriction against flow along the complete length of the tube.

All of the tubes described in this specification can be conveniently manufactured by continuously extruding thermoplastic polymers and compositions as indicated as continuous cross-sections or profiles and then flattening them so that the walls of these tubes may be automatically and repetitively secured together as indicated by known techniques such as heat sealing or welding. When so formed, these various tubes may be easily coiled up in a lay-flat condition for handling, storage and shipping. A user will have no difficulty in cutting such a length of tube to a desired length in a particular field. Normally a conventional water connection will be made to one end of a length of a tube in a particular field and the other end of such a length will be closed off in a conventional manner such as through the use of a clamp.

I claim:

1. A tube for use in distributing water along the length of the tube, said tube having a plurality of outlets located along its length, said tube being formed of an impervious material, in which the improvement comprises:
   means securing walls of said tube together within the interior of said tube adjacent to each of said outlets so as to restrict the flow of water to each of said outlets from the interior of said tube, the interior of said tube being open past said means.

2. A tube as claimed in claim 1 wherein:
   said means are lines joining interior walls within said tube together so as to define at least one flow passage leading from the interior of said tube to each of said outlets, said flow passages of each of said means being sufficiently small so as to provide resistance to flow from within the interior of said tube to each of said outlets.

3. A tube as claimed in claim 1 wherein:
   said means are a series of points joining interior walls within said tube together so as to define a multiplicity of tortuous flow paths leading from the interior of said tube to each of said outlets, said flow paths of each of said means being sufficiently small so as to provide resistance to water flow from within the interior of said tube to each of said outlets.

4. A tube as claimed in claim 1 wherein:
   said means are groups of lines joining interior walls within said tube together adjacent to each of said openings so as to define a labyrinth type of flow passage leading from the interior of said tube to each of said outlets, said flow passages of said means being sufficiently small so as to provide resistance to flow from within the interior of said tube to each of said outlets.

5. A tube as claimed in claim 4 wherein:
   said flow passages have "dead end" areas which tend to trap and hold sediment as water flows through said flow passages so as to minimize clogging within these flow passages.

6. A tube as claimed in claim 1 wherein:
   said tube is formed of a biodegradable composition and is capable of being broken up by an agricultural implement.

7. A tube as claimed in claim 1 wherein:
   said outlets are outlet openings located centrally of said tube.

8. A tube as claimed in claim 1 including:
   extensions extending from said tube capable of being utilized to cover areas to both sides of said tube around said outlets so as to inhibit plant growth under said extensions.

9. A tube as claimed in claim 1 including:
   extensions extending from remote sides of said tube capable of being utilized to cover areas around said outlets so as to inhibit plant growth under said extensions,
   and wherein,
   said tube and said extensions are integrally formed of a biodegradable composition capable of being broken up by an agricultural implement, said outlets are outlet openings through which plants are capable of growing during the use of said tube, and said means are lines joining interior walls within said tube together so as to define at least one flow passage leading from the interior of said tube to each of said outlets, said flow passages of each of said means being sufficiently small so as to provide resistance to flow from within the interior of said tube to each of said outlets.

10. A tube as claimed in claim 1 including:

extensions extending from remote sides of said tube capable of being utilized to cover areas around said outlets so as to inhibit plant growth under said extensions, and wherein, said tube and said extensions are integrally formed of a biodegradable composition capable of being broken up by an agricultural implement, said outlets are outlet openings through which plants are capable of growing during the use of said tube, and said means are a series of points joining interior walls within said tube together so as to define a multiplicity of tortuous flow paths leading from the interior of said tube to each of said outlets, said flow paths of each of said means being sufficiently small so as to provide resistance to water flow from within the interior of said tube to each of said outlets.

11. A tube as claimed in claim 1 including:

extensions extending from remote sides of said tube capable of being utilized to cover areas around said outlets so as to inhibit plant growth under said extensions, and wherein, said tube and said extensions are integrally formed of a biodegradable composition capable of being broken up by an agricultural implement, said outlets are outlet openings through which plants are capable of growing during the use of said tube, and said means are groups of lines joining interior walls within said tube together adjacent to each of said openings so as to define a labyrinth type of flow passage leading from the interior of said tube to each of said outlets, said flow passages of said means being sufficiently small so as to provide resistance to flow from within the interior of said tube to each of said outlets.

12. A tube as claimed in claim 1 wherein:

said means securing walls of said tube together are located so as to define flow channels of a uniform cross-sectional configuration located parallel to one another along the edges of said walls, and said outlets are located midway between said flow channels so as to be spaced from both of said flow channels by said means.

13. A tube as claimed in claim 1 wherein:

said tube is integrally formed of a biodegradable composition capable of being broken up by an agricultural implement, said means securing said walls together are located so as to define flow channels of a uniform cross-sectional configuration located parallel to one another along the edges of said walls and so as to define a distribution channel located midway between said flow channels, and said outlets are openings within said distribution channel.

* * * * *

UNITED STATES PATENT OFFICE
CERTIFICATE OF CORRECTION

Patent No. 3,774,850                Dated November 27, 1973

Inventor(s)  David G. Zeman

It is certified that error appears in the above-identified patent and that said Letters Patent are hereby corrected as shown below:

Column 1, line 16, correct spelling of word "several".

Column 1, line 52, after . . undue . ., the word "water" should read --waste--.

Column 3, line 57, "drowing" should read --growing--.

Column 4, line 32, "capable" should read --incapable--.

Column 5, line 52, "raw" should read --row--.

Signed and sealed this 30th day of April 1974.

(SEAL)
Attest:

EDWARD M.FLETCHER,JR.                C. MARSHALL DANN
Attesting Officer                    Commissioner of Patents